United States Patent [19]
Thurm et al.

[11] Patent Number: 5,152,879
[45] Date of Patent: Oct. 6, 1992

[54] PROCESS FOR THE TREATMENT OF POLYOLEFIN FILMS

[75] Inventors: Siegfried Thurm, Meerbusch; Ulrich Reiners, Neuenkirchen; Ingo Schinkel, Walsrode; Manfred Kowitz, Moers, all of Fed. Rep. of Germany

[73] Assignee: Wolff Walsrode AG, Walsrode, Fed. Rep. of Germany

[21] Appl. No.: 634,374

[22] Filed: Dec. 27, 1990

[30] Foreign Application Priority Data

Jan. 3, 1990 [DE] Fed. Rep. of Germany ....... 4000045

[51] Int. Cl.$^5$ .......................... H05F 3/06; B05D 3/06
[52] U.S. Cl. .................................... 204/165; 427/536
[58] Field of Search ................. 204/165, 168; 427/40, 427/38; 205/927

[56] References Cited

U.S. PATENT DOCUMENTS

| | | | |
|---|---|---|---|
| 3,274,090 | 9/1966 | Amborski | 204/165 |
| 3,274,091 | 9/1966 | Amborski | 204/165 |
| 3,686,018 | 8/1972 | Lindblom et al. | 427/40 |
| 4,165,394 | 8/1989 | Ehrbar et al. | 427/40 |
| 4,765,860 | 8/1988 | Ueno et al. | 427/40 |

FOREIGN PATENT DOCUMENTS 0109334 5/1984 European Pat. Off. .
0311197 4/1989 European Pat. Off. .
208333 8/1990 Japan .

OTHER PUBLICATIONS

Chemical Abstracts 87:69327a.
Chemical Abstracts 91:194335k.
Database WPIL, Accession No. 82-71220E [34], Derwent Publications, Ltd. London, GB: & JP-A-57 115 431.
Database WPI, Accession No. 79-60492B [33], Derwent Publications Ltd. London, GB; & JP-A-54 083 971.

Primary Examiner—John Niebling
Assistant Examiner—Brian M. Bolam
Attorney, Agent, or Firm—Sprung Horn Kramer & Woods

[57] ABSTRACT

The bonding properties of polyolefin films in composites are improved by a treatment with a low pressure plasma.

12 Claims, No Drawings

PROCESS FOR THE TREATMENT OF POLYOLEFIN FILMS

This invention relates to a process for the treatment of polyolefin films with a low pressure plasma for improving the bonding properties in composites, in particular in relation to adhesives and printing inks.

Processes for the pretreatment of polyolefins with a low pressure plasma are known in the literature. Thus British Patent Specification 997 093 describes a process for the treatment of polymers of hydrocarbons in an electric discharge at a pressure of up to 1.3 mbar for the purpose of improving the dye absorption of the polymer by a subsequent graft polymerisation.

No information is given as to the power density or energy density or the distance of the electrodes during the pretreatment.

U.S. Pat. No. 3,274,091 describes a process for the treatment of polymer films in a gas discharge in an atmosphere of an organic gas, e.g. acrylic acid, and a carrier gas, e.g. nitrogen. No information is given as to the pressure during the process but the apparatus described for carrying out the process according to the invention suggests that the process is carried out at a pressure close to normal pressure (1013 mbar). The distance of the electrodes from the polymers to be treated is from 0.25 to 3.2 mm. The energy density is of the order of $16 \times 10^{-3}$ Ws/cm$^2$.

A process for the pretreatment of organic substrates in a low pressure plasma followed by treatment of the pretreated substrate in an oxidizing gas atmosphere to reduce the permeation of gas through a metal layer subsequently applied by vapour deposition is claimed in U.S. Pat. No. 3,686,018. The pretreatment described in the said Specification takes place at gas pressure of from $1.3 \times 10^{-2}$ to 1.3 mbar. The distance of the electrodes from the organic substrate is 50 mm. The energy density on the substrate is not specified.

Japanese Patent JA 83-785 847 describes a process for the pretreatment of injection moulded parts in a microwave plasma at a frequency of 2.45 GHz. The pressure is from $0.13 \times 10^{-2}$ to 13 mbar. No figures are given for the distance of the electrodes since the microwave radiation is not coupled into the receiver capacitively but presumably through a hollow conductor and a quartz window. The energy density on the substrate is not stated.

In EP 0 127 149 a process for the treatment of thermoplastics is described in which the thermoplastic is subjected to plasma treatment at temperatures equal to or higher than the melting point or glass transition temperature of the thermoplastic in order to increase its surface energy and thus to improve adhesion during varnishing, printing and lamination. This process has the disadvantage of a possible reduction in the mechanical and optical properties, i.e. tensile strengths, gloss and transparency of the thermoplastic.

The fundamental principles and possibilities of application of low pressure plasma are discussed in the Journal "Adhäsion", No. 5 1989, pages 10 to 15 and in "Nieder-druckplasma" by G. Ecker, 1988, Publishers VDI-Verlag, düsseldorf.

It is an object of the present invention to provide an improved process for the pretreatment of polyolefin films.

The invention relates to a process for the treatment of polyolefin films by treating the polyolefin films with low pressure plasma, characterised in that the low pressure plasma is activated by electric fields with frequencies of up to 100 MHz by means of electrodes, in that the process gas contains oxygen-containing gases, and in that the partial pressure of the oxygen-containing process gases is at least $5 \times 10^{-2}$, in particular $10^{-1}$ mbar, the energy density on the component of polyolefins is at least 0.01 Ws/cm$^2$ and at most 10 Ws/cm$^2$ and the distance of the electrodes from the polyolefin films is at least 60 mm and the temperatures during the treatment of the polyolefin films are at most $+30°$ C.

The pretreatment according to the invention substantially improves the bonding of polyolefin films in composites.

The polyolefins to be used for the polyolefin films preferably have an equilibrium molecular weight MW from about 50,000 to 300,000, preferably from 80,000 to 200,000, the MW being determined by gel chromatography in known manner.

The polyolefin used is preferably an isotactic polypropylene having a density of 0.9 to 0.91 g/cm$^3$ and a melt flow index of 1 to 4 g/10 min at 230° C./21.6 N (according to DIN 53 735).

In a preferred embodiment, films produced from polyolefins are pretreated according to the invention.

The films may be composed of a single layer or several layers.

Particularly preferred examples of multilayered films have a base layer of polypropylene.

The base layer may, for example, contain from 3 to 15% by weight, preferably from 8 to 12% by weight, of additives which are incompatible with the polypropylene, preferably inorganic additives such as potassium carbonate, silicon dioxide, sodium aluminium silicate and/or titanium dioxide, which may render the film opaque. The base layer may, however, also contain an organic incompatible additive finely distributed therein, preferably consisting of particles of polystyrene, polymethylmethacrylate, polytetrafluoroethylene, polycarbonate and/or copolymers of these compounds. Incompatibility means in this context that the polymeric additives have a different melting point and/or different stretching ratio from the polypropylene so that under suitable conditions the biaxial orientation process of the multilayered film leads to tearing of the polymer matrix and hence vacuole formation, which also occurs when inorganic additives are used. The present invention therefore further relates to opaque multilayered films which have undergone the pretreatment according to the invention.

In a preferred embodiment, the films carry a heat sealing layer known per se, in particular consisting of copolymers of propylene.

The multilayered films may also contain a gas barrier layer, preferably an oxygen barrier layer of a saponified ethylene/vinyl acetate copolymer containing from 40 to 85 mol-% of vinyl acetate units at least 90% by weight of which, preferably more than 96% by weight, is saponified, and optionally conventional layers of bonding primers. The preparation of such ethylene/vinyl alcohol copolymers is known. The present invention therefore also relates to heat sealing multilayered films which have a low permeability to gases and excellent aroma protection.

The multilayered films which have been treated according to the invention may carry a thermocompression bonding layer of a low boiling polymer on one side while the other side has been pretreated according to the invention. Such a film may first be joined to other substrates by the application of heat under pressure and subsequently bonded and printed on the side which has been pretreated according to the invention.

The layers of the films may be treated with conventional additives and auxiliary agents such as lubricants, antiblocking agents and antistatic agents used in the usual quantities.

The films may be produced by conventional processes such as lamination, coating or melt (co)extrusion. The films are preferably stretched at least monoaxially, more preferably biaxially. Longitudinal stretching is preferably carried out in a ratio of from 5:1 to 7:1 and transverse stretching in a ratio of from 7:1 to 10:1.

In multilayered films, the polypropylene base film should preferably have a thickness of from 20 to 50 $\mu$m and a heat sealing layer should preferably have a thickness of from 0.8 to 2 $\mu$m, most preferably about 1 $\mu$m.

Films treated according to the invention are particularly suitable for use as packaging material.

The pretreatment in a plasma is carried out in a vacuum plant in which the polyolefin film is preferably wound on a spool and carried from the take-off spool to the take-up spool by a winding mechanism. Typical process pressures are from 0.1 to 1 mbar. The process gases used are preferably oxygen-containing gases such as $O_2$, $H_2O_2$, $H_2O$, $N_2O$, $NO_2$ or $O_3$ and mixtures with noble gases such as He, Ne, Ar, Kr or Xe. The plasma is activated by an electric field with frequencies of up to 100 MHz, preferably from 0 to 30 MHz.

The polyolefin film is at a distance of at least 60 mm from the electrodes to which the electric field for production of the plasma is applied.

It is important that the energy density on a unit surface of polyolefin film should not fall below 0.01 Ws/cm$^2$ during the pretreatment because the intensity of pretreatment would then not be sufficient to ensure good bonding of the polyolefin film in a composite with other materials. On the other hand, an energy density above 10 Ws/cm$^2$ is generally not desirable as this would irreversibly damage the surface of the polyolefin film by breaking up the bond between olefin chain links in a layer close to the surface, thereby creating a boundary layer with almost oligomeric chain links, which would result in poor bonding of the polyolefin film in the composite subsequently to be produced.

In addition it is important that the temperatures of the film do not exceed 30° C. during the treatment and are preferably in the range from $-2°$ C. to 10° C., since otherwise adhesion is a composite subsequently produced remains low and the gloss of the films is considerably reduced.

When the film has been pretreated in accordance with the invention, it is removed from the vacuum installation and may undergo further treatment to form a composite. This treatment may be carried out by, for example, laminating the film with another component on paper or cardboard by means of adhesive or by applying a metal layer or a layer of inorganic oxides, for example by vapour deposition. Such composites are used, for example, in the packaging industry and have, for example, excellent optical properties such as high gloss or excellent gas barrier properties.

In addition, the film which has been pretreated according to the invention is eminently suitable for printing with difficult printing ink systems such as water based systems. These printing inks are used in the packaging industry for reasons of environmental protection.

In a particularly preferred embodiment, biaxially stretched polypropylene films are pretreated according to the invention on one side and pretreated with a corona discharge on the other side. The film is laminated with cardboard by conventional processes on the side which has been treated with corona discharge. The composite is suitable for working up in high speed machines for glueing folded boxes on account of the high affinity for adhesives of the side which has been pretreated according to the invention.

EXAMPLE 1

An extruded biaxially stretched film of isotactic polypropylene 20 $\mu$m in thickness is used as the polyolefin film to be treated as part of a composite to be produced. This film is wound on the hub of a reel as a sheet 150 mm in width and about 1000 mm in length. The film is introduced into a vacuum treatment plant for webs manufactured by ULVAC (Chigasaki, Japan, Model EWH 015) and transferred to a cooled guide roller by way of a plurality of width-stretching and floating rollers. From this guide roller, the film is again passed over width-stretching rollers and floating rollers to be transferred to the winding core.

An electrode 163 mm in width and 293 mm in length equipped with a dark room shield is placed concentrically to the guide roller at a distance therefrom of 75 mm.

After the film has been placed in position, the apparatus is closed and evacuated down to a pressure of $10^{-5}$ mbar.

Oxygen is then introduced into the apparatus at a gas flow rate of 168 Ncm$^3$/min so that a total gas pressure of $1\times10^{-1}$ mbar is established in the vacuum plant. The winding mechanism in the plant is then switched on and the film is carried past the electrode at a speed of 30 m/min on the cooled guide roller which is at a temperature of $-2°$ C., and is then wound on to the take-up roller. At the same time, a direct voltage of $-1000$ V is applied to the electrode so that a plasma burns between the electrode and the film at a current of about 0.4 A, i.e. the plasma power is about 400 W. At the speed mentioned above, the residence time of the film in the plasma zone is about 0.6 seconds. When the electrode surface area is about 480 cm$^2$, the energy density on the film is about 0.5 W/cm$^2$.

When about 800 m of film have been treater, the high voltage is switched off, the winding mechanism is stopped and the guide roller is heated to about 30° C. The vacuum treatment plant is then ventilated and the film is removed.

To produce a composite, a piece of this pretreated film and a piece of untreated film are laminated to a piece of cardboard.

For this purpose, an approximately 50 $\mu$m thick film of the adhesive Adhesin 7034 of Henkel, Düsseldorf is applied to the cardboard by brush coating and both the untreated and the treated film are applied and put under a pressure of 10 g/cm$^2$ for 5 minutes. The composite is then set by 12 hours' storage under normal conditions. The untreated film can then be removed from the cured adhesive on the cardboard without damage to the cardboard, i.e. the composite between the cardboard and the polypropylene film is very weak.

On the other hand, it is found that the treated film cannot be stripped from the adhesive or from the cardboard. Instead, when attempts are made to remove the film, parts of the cardboard become detached, i.e. an excellent bond has been established between the film and the cardboard.

EXAMPLE 2

The polyolefin film to be treated for the production of a composite is a coextruded, biaxially stretched film of isotactic polypropylene 20 µm in thickness coated with a heat sealing layer of polypropylene-polyethylene adhesive of Wolff-Walsrode AG. A piece of this film 150 mm in width and about 1000 m in length is wound on to a winding core and installed in the vacuum plant described in Example 1. This plant is modified compared with Example 1 in that the distance of the electrode from the guide roller is 100 mm.

The experiment for treating the film with a plasma is carried out substantially as described in Example 1. In contrast to Example 1, the voltage at the electrode is $-380$ V so that a plasma burns with a current of 0.1 A, i.e. the plasma power in the case of Example 2 is about 38 W. This provides an energy density on the film of 0.05 Ws/cm$^2$.

After completion of the pretreatment, the film is removed from the vacuum plant and an Al layer about 500 Å in thickness is applied by vapour deposition in another plant. Processes for the vapour deposition of Al are known from the literature. Such coating may be carried out, for example, by evaporating Al from a BN boat heated directly by a passage of current or from a crucible heated by an electron beam so that the Al is deposited on the film which is on a cooled roller (see Frey/Kienel: Dünnschicht-technik VDI-Verlag, 1987, pages 572-592).

An untreated film is similarly coated by vapour deposition.

A strip of adhesive tape 133 of Beiersdorf about 20 cm in length is applied to the metal layer of both the composites prepared as described above. After a storage time of about 12 hours, the adhesive tape is stripped from both composites. In the composite in which the Al layer was deposited on the pretreated polypropylene film, the Al layer remains on the film, i.e. the composite shows excellent bonding of the components.

In the composite in which the Al layer was applied to the untreated film, the film pulls off the Al layer together with the adhesive tape, i.e. the composite shows poor bonding of the components.

We claim:

1. A process for the treatment of polyolefin films with a low pressure plasma, wherein the low pressure plasma is activated by electric fields using frequencies of up to 100 MHz by means of electrodes, wherein the process gas comprises oxygen-containing gases and wherein the partial pressure of the oxygen-containing process gases is at least $5 \times 10^{-2}$ mbar, the energy density on the component of polyolefins is at least 0.01 Ws/cm$^2$ and at most 10 Ws/cm$^2$ and the distance of the electrodes from the polyolefin film is at least 60 mm, characterized in that the temperatures during the treatment of the polyolefin films are at most $+30°$ C.

2. A process according to claim 1, characterized in that polyolefin films consist of polypropylene, polyethylene, a copolymer or a mixture thereof.

3. A process according to claim 1, characterized in that the films are extruded films.

4. A process according to claim 1, characterized in that the films are composed of several layers.

5. A process according to claim 3, characterized in that the extruded films are stretched at least monoaxially.

6. A process according to claim 4, characterized in that the films are heat sealing, biaxially stretched polypropylene films.

7. A process according to claim 4, characterized in that the films are biaxially stretched polypropylene films carrying a thermocompression bonded layer on one side.

8. A process according to claim 1, characterized in that the films have been pretreated by corona discharge.

9. A process according to claim 1, characterized in that the thickness of the films is from 0.5 µm to 100 µm.

10. A process according to claim 1, characterized in that the process gas contains O$_2$ and/or some other oxygen-containing gas.

11. A process according to claim 8, characterized in that He, Ne, Ar, Kr and Xe are present in addition.

12. A process according to claim 1 characterized in that the temperature of the films during the pretreatment is between $-2°$ C. and $+10°$ C.

* * * * *